United States Patent [19]

Moore

[11] Patent Number: 5,240,215
[45] Date of Patent: Aug. 31, 1993

[54] UNIVERSAL COMPUTER SUPPORT BRACKET

[75] Inventor: Steven J. Moore, Omaha, Nebr.

[73] Assignee: Automated Monitoring and Control International, Inc., Omaha, Nebr.

[21] Appl. No.: 933,813

[22] Filed: Aug. 24, 1992

[51] Int. Cl.$^5$ .............................. E04G 3/00
[52] U.S. Cl. .................... 248/278; 108/10; 248/288.3; 248/919
[58] Field of Search ............. 248/917, 918, 919, 920, 248/921, 922, 923, 276, 278, 279, 283, 285, 286, 288.3; 108/4, 6, 10, 148

[56] References Cited

U.S. PATENT DOCUMENTS

| | | |
|---|---|---|
| 393,649 | 11/1888 | Kirkpatrick . |
| 755,668 | 3/1904 | Hurxthal . |
| 1,386,151 | 8/1921 | Brewer . |
| 2,679,992 | 6/1954 | Schuette . |
| 3,151,576 | 10/1964 | Patterson . |
| 3,478,993 | 11/1969 | Wyeroski et al. ............. 108/148 X |
| 4,516,751 | 5/1985 | Westbrook .......................... 248/276 |
| 4,687,166 | 8/1987 | Poehler .............................. 248/279 |
| 4,791,873 | 12/1988 | Towfigh .............................. 108/10 |
| 4,830,328 | 5/1989 | Takach, Jr. et al. ................ 248/639 |
| 4,880,300 | 11/1989 | Payner et al. ..................... 248/918 X |
| 4,923,162 | 5/1990 | Fleming et al. ..................... 248/276 |

Primary Examiner—Ramon O. Ramirez
Attorney, Agent, or Firm—John A. Beehner

[57] ABSTRACT

A universal computer support bracket adapted for use in a vehicle, particularly in a train. The bracket includes a channel to be mounted on a vertical surface. Slidably mounted in the channel is one end of a folding table support bracket. Pivotally mounted to the other end of the folding table support bracket is a folding table which may be pivoted between a substantially horizontal support position and a substantially vertical storage position. Mounted on the folding table is a pivot joint assembly on which is mounted a computer support table. The computer support table may thus be tilted to facilitate use of the computer. The invention is thus designed specifically to provide a reliable, sturdy and steady computer support bracket for use in a variety of situations, while recognizing and addressing important space considerations.

18 Claims, 5 Drawing Sheets

UNIVERSAL COMPUTER SUPPORT BRACKET

BACKGROUND OF THE INVENTION

1. Technical Field

This invention relates to a universal computer support bracket, and, more particularly, to a universal computer support bracket for use in vehicles, particularly trains, which can be adjusted quickly in both height and angle, and may be folded down against the vertical surface to which it is mounted for space-saving storage.

2. Description of the Prior Art

Train operation in the present day is vastly different in many ways from that of only a few decades ago. Today's conductors must receive constant information on work to be performed for the work order reporting system as well as speed, stress, load factors, weather conditions up ahead, and so on, in order to safely control the train. To assist in these tasks, on board computers are becoming standard in the industry. However, when the engines now used were built, there was no need to provide space for a computer as computers were not used in the cabs of engines. Therefore, there is a need for an easily operable computer support bracket which may be used in the cab of a train. Presently available computer support brackets do not satisfy the unique needs of the train conductor, among which are that the bracket be vertically adjustable and be installable in most, if not all, cabs. Moreover, the support bracket must be able to fold down to a storage position to allow efficient use of the often already cramped cab space and the bracket must also be constructed of very tough and durable materials. Finally, the support bracket should allow for the computer to be tilted from horizontal to accommodate the particular preference of any conductor for maximum comfort over an extended run. As no presently available computer support bracket fulfills all of these needs, it is a primary object of the present invention to provide an improved universal computer support bracket.

Another object of the present invention is to provide a universal computer support bracket for use in a vehicle such as a train.

Yet another object is to provide a bracket which may be quickly and easily adjusted in both height and angle, for ease of use of the mounted computer.

Still another object is to provide a bracket which may be folded down against the vertical surface to which it is mounted, thus providing a space-saving storage means.

Another object is to provide a bracket which is tough and durable for use in a variety of heavy-duty situations.

Finally, an object of the present invention is to provide a universal computer support bracket which is safe to use, durable in construction and simple to manufacture.

SUMMARY OF THE INVENTION

The present invention provides a universal computer support bracket for use in a variety of situations, including in vehicles such as trains. The bracket consists of a channel which is to be mounted on a vertical surface by any appropriate means such as screws or toggle bolts. Slidably mounted in the channel to allow motion therealong is one end of a folding table support bracket. Pivotally mounted on the opposite end of the folding table support bracket is a folding table which may be pivoted between a substantially horizontal support position for supporting a computer or the like, and a substantially vertical storage position which allows the folding table to be stored in a space-saving arrangement when not in use.

Mounted on the folding table is a pivot joint assembly on which is mounted a computer support table. The computer support table may thus be tilted relative to said folding table to facilitate use of the computer by adjusting the angle of use.

The support bracket as described thus fulfills many of the needs that computer users have whose work stations are outside of an office or other such controlled environment. The present invention is designed specifically to provide a reliable, sturdy and steady computer support bracket for use in such jobs as described above, while still recognizing and addressing important space considerations.

DESCRIPTION OF A PREFERRED EMBODIMENT

Figure 1:
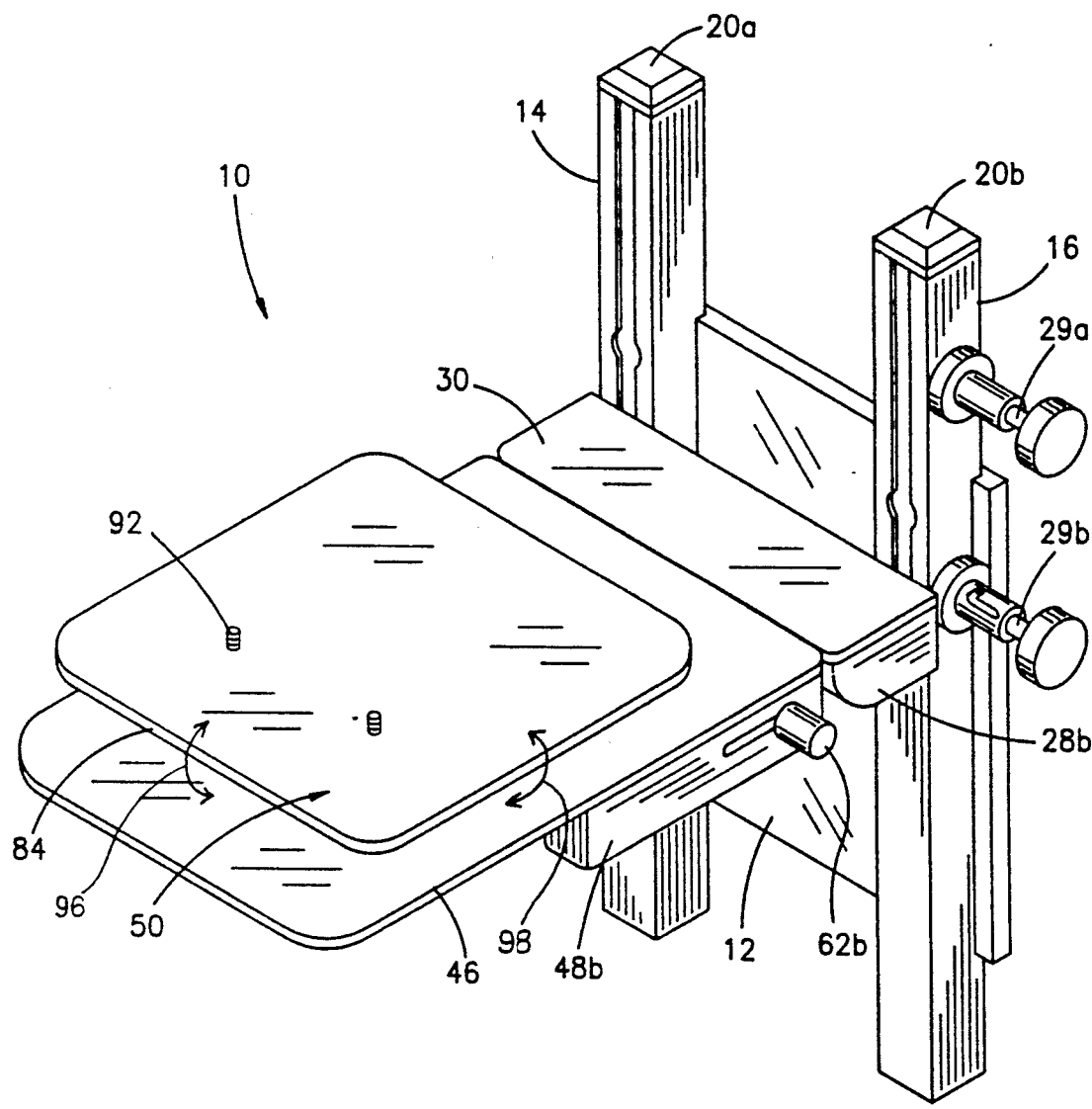
FIG. 1 is a perspective view of the invention showing the various elements therein.
Figure 3:
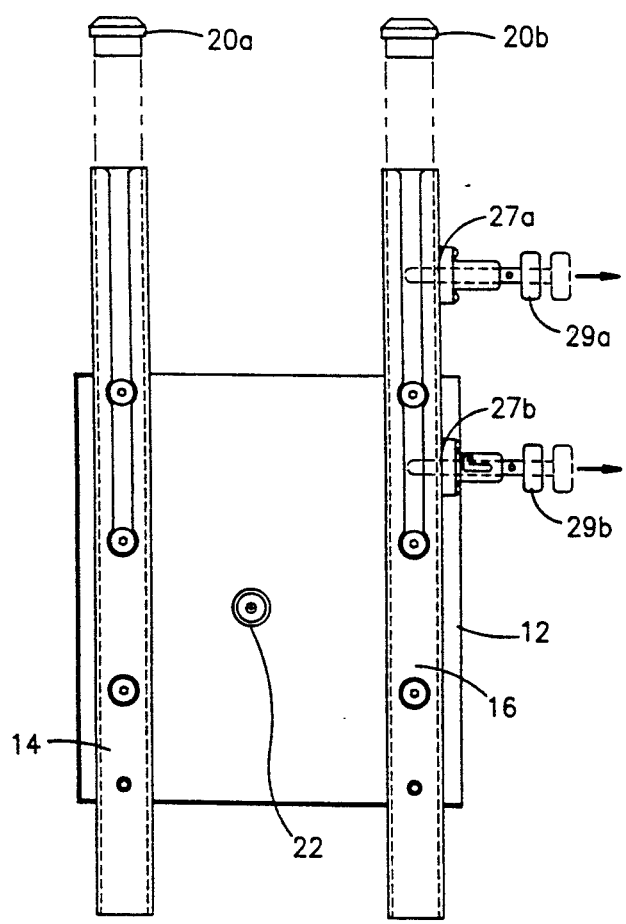
FIG. 3 is a front elevational view of the mounting bracket and channels.

The universal computer support bracket 10 is shown in its preferred embodiment in FIG. 1 as having a channel alignment plate 12 which is preferably a rectangular piece of rigid flat metal somewhat wider than the distance between the channels 14 and 16. The left and right channels, 14 and 16 respectively, should be mounted on the channel alignment plate 12 in spaced apart relation each with the closed channel back adjacent the channel alignment plate 12. Each channel 14 and 16 is preferably constructed of square tubing having a section of one side removed as shown in FIGS. 1 and 3.

Compressibly mounted within each channel 14 and 16 is a compression spring 18a and 18b, preferably about 14" long. Each spring is immovably secured at its lower end, while the upper end may travel freely along the channel 14 and 16.

In a preferred embodiment, secured to the top of each channel 14 and 16 is a channel cap 10a and 20b which both restricts expansion of the compression spring 18a and 18b and helps prevent injury caused by contacts with the channel top. Furthermore, mounted on the channel alignment plate 12 is a rubber bumper 22 (FIGS. 3, 4 and 7) for cushioning the impact of the folding table 46 when it is swung into storage position.

Slidably mounted in each channel 14 and 16 is a channel guide 24a and 24b preferably constructed of a rectangular block having substantially square ends to fit within each channel 14 and 16. Each channel guide 24a and 24b is preferably fitted with three bolt-receiving securement holes 25 (FIG. 2), any of which may be aligned with one of the height adjustment holes 27a and 27b (FIG. 3) formed in a side of each channel 14 and 16. One of the securement pins 29a and 29b may then be inserted through the respective height adjustment hole 27a or 27b one of the bolt-receiving securement holes 25, thereby securing the channel guides 24a and 24b at the desired height. The present invention may also be secured at the lower height, shown by height adjustment hole 27b and securement pin 29b, to allow access behind the universal computer support bracket 10.

Figure 4:
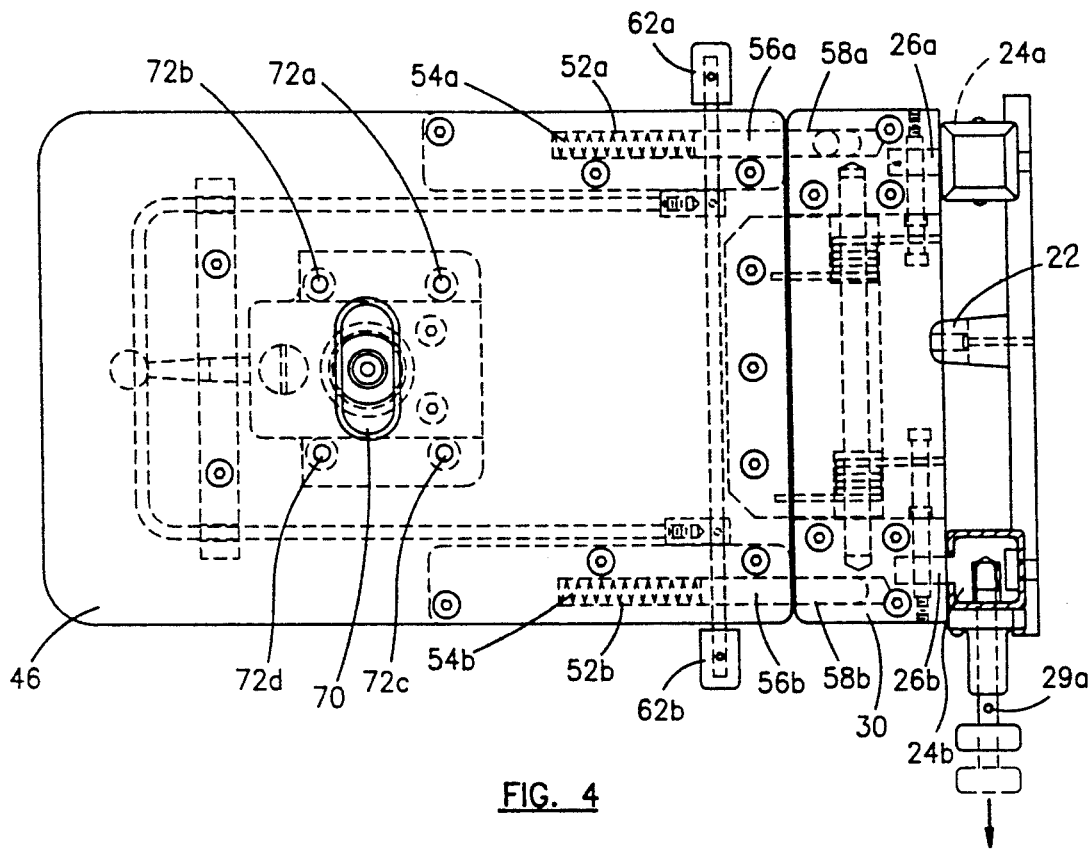
FIG. 4 is a top plan view of the invention showing the table and inner workings.

Extending outward from each channel guide 24a and 24b is a support member 26a and 26b as shown in FIG. 4. Mounted on each support member 26a and 26b is a stationary table block 28a and 28b each preferably constructed of a rectangular block of metal with various holes drilled therein, as will be described later.

Figure 2:
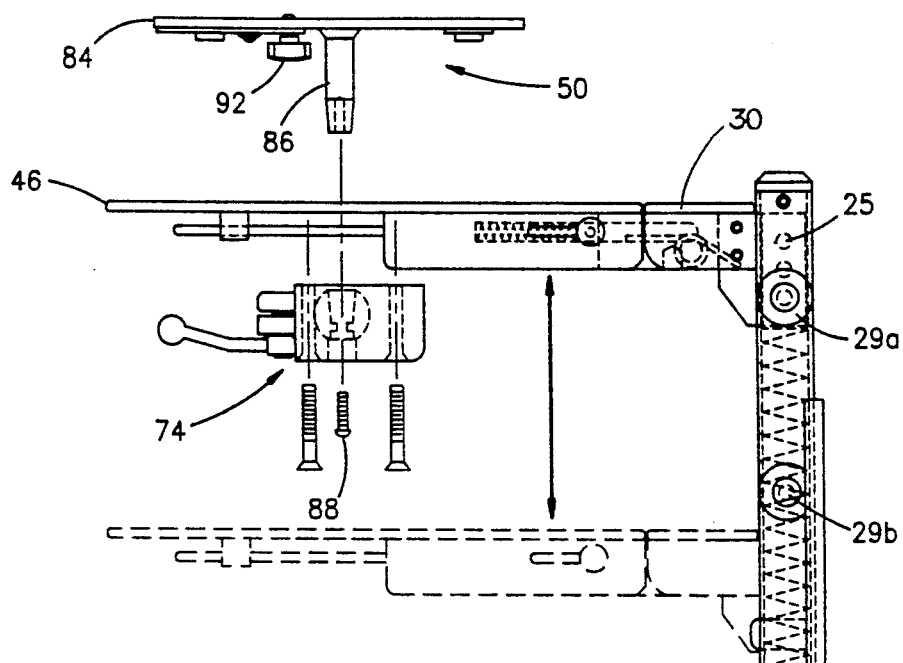
FIG. 2 is a side elevational view of the invention showing the vertical movement of the table.

Extending between and connected to the top surface of each stationary table block 28a and 28b is a stationary table top 30 as shown in FIGS. 2 and 4. The stationary table top 30 may be constructed either of high-strength plastic or metal, and should be substantially horizontal, thereby keeping the stationary table blocks 28a and 28b at substantially the same relative height. The length of the table top 30, or shorter side, is preferably the same as the length of the longest side of the stationary table block 28a and 28b, and the width of the table top 30, or longer side, is sufficient such that each stationary table block 28a and 28b may be secured such that the channel guides 24a and 24b will be aligned to fit within their respective channels 14 and 16.

Extending between and connected to each stationary table block 28a and 28b is a pivot rod 32 preferably constructed of a section of standard metal rod. The rod 32 may be secured in place by drilling a pair of holes, one in each of the inwardly facing opposite sides of the stationary table blocks 28a and 28b, then inserting an end of the pivot rod 32 into each hole, thus securing the pivot rod 32 in place.

Figure 5:
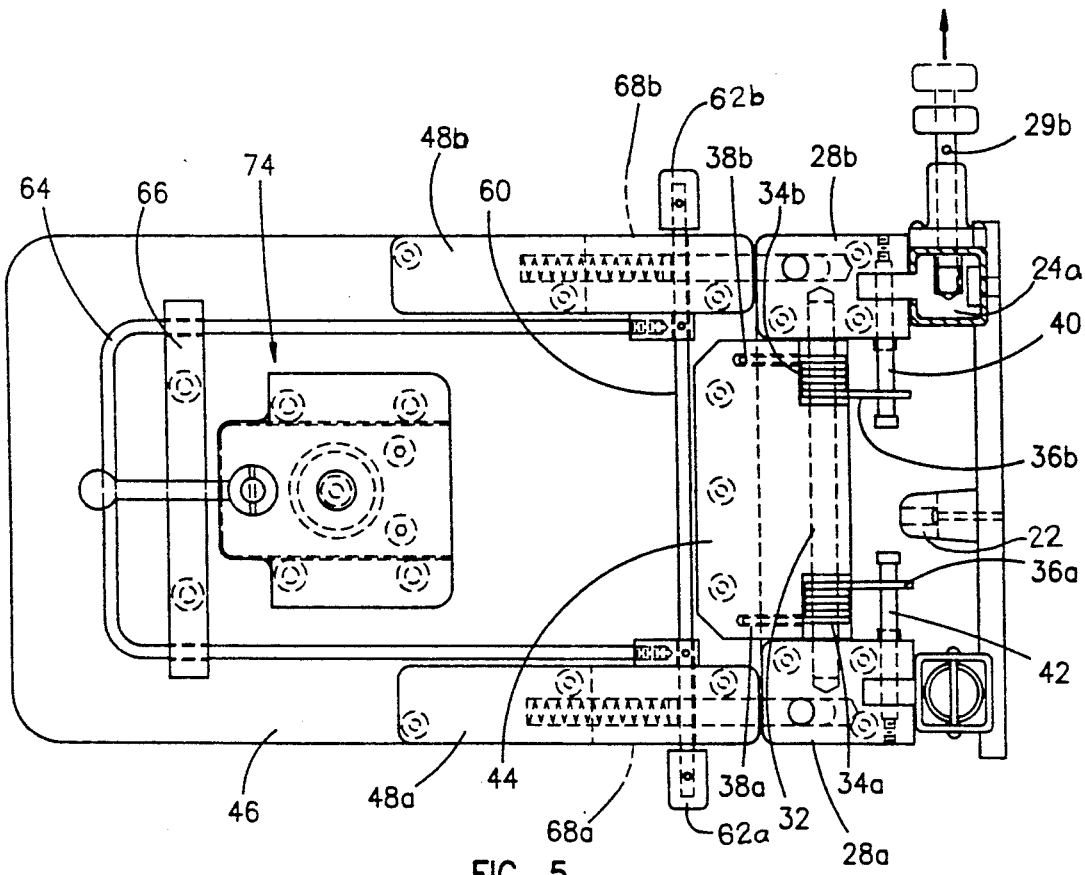
FIG. 5 is a bottom plan view of the invention.

Rotatably mounted on the pivot rod are a pair of torsion springs 34a and 34b preferably consisting of a coiled metal rod with a rearward pointing end 36a and 36b and a forward pointing end 38a and 38b. Extending inward from opposite inward sides of each stationary table block 28a and 28b is a shoulder screw 40 and 42 under each of which extends a rearward pointing end 36a and 36b of a torsion spring 34a and 34b as shown in FIG. 5. Rotational motion of each torsion spring 34a and 34b is thus restricted.

Extending between and connected to the forward pointing ends 38a and 38b of the torsion springs 34a and 34b is a pivot block 44 which is preferably constructed of material similar to that used in the stationary table blocks 28a and 28b. The pivot block 44 should be slightly wider than the distance between the outer edges of the torsion springs 34a and 34b, and should preferably extend lengthwise from the rear edge of the coiled section of the torsion springs 34a and 34b forward approximately 1-3" past the forward edge of the stationary table top 30. The pivot block 44 is preferably positioned such that the pivot rod 32 extends through the rear section of the pivot block 44 through a pair of holes drilled in the pivot block 44 for that purpose. The pivot block 44 is thus pivotally secured on the pivot rod 32 and beneath the stationary table top 30 such that the front of the pivot block 44 may be pivoted downwards without having the rear top edge of the pivot block 44 contact the lower surface of the stationary table top 30. In the preferred embodiment the rear top edge of the pivot block 44 is planed to an angle which accomplishes the desired result.

The torsion springs 34a and 34b act to pivot the front edge of the pivot block 44 upwards, and the springs 34a and 34b are kept in tension by the rearward pointing ends 36a and 36b being secured beneath the respective shoulder screws 40 and 42 as shown in FIG. 5. The folding table 46, described below, may thus be pivoted between a vertical storage position and a horizontal support position, assisted in pivoting by the torsion springs 34a and 34b. The folding ability is a key element of the invention as it allows a user to conveniently store the invention when not in use.

Mounted on the top forward section of the pivot block 44 is the folding table 46 which is preferably constructed of material similar to that used in the stationary table top 30 and is rectangular in shape, being longer than wide as shown in FIG. 4. Mounted to the underside of the folding table 46 are a pair of folding table blocks 48a and 48b which are preferably constructed of material similar to that used in the stationary table blocks 28a and 28b.

The folding table blocks 48a and 48b are positioned one adjacent each longer side of the folding table 46 with the front edge of each approximately at the midpoint of each longer side of the folding table 46. Each block 48a and 48b extends rearwardly to the rear edge of the folding table 46.

Drilled into the rearward facing side of each folding table block 48a and 48b is a spring-receiving hole 52a and 52b (FIG. 4) into each of which a compression spring 54a and 54b is inserted, each spring 54a and 54b being approximately 3" long. Each compression spring 54a and 54b may be attached at one end to the base of the spring-receiving hole 52a and 52b into which it has been inserted. To the opposite end of each compression spring 54a and 54b is mounted a support shaft 56a and 56b each approximately 4" in length. Drilled into the adjacent side of each stationary table block 28a and 28b is a support shaft receiving hole 58a and 58b approximately 1½"-2" in depth.

Extending between and connected to the end of each support shaft 56a and 56b adjacent the compression springs 54a and 54b is a support shaft pull rod 60 (FIG. 5). The support shaft pull rod 60 preferably extends outward past each longer side of the folding table 46. Mounted on each end of the support shaft pull rod 60 is a rod cap 62a and 62b which allows for easier gripping of the pull rod ends.

Figure 6:
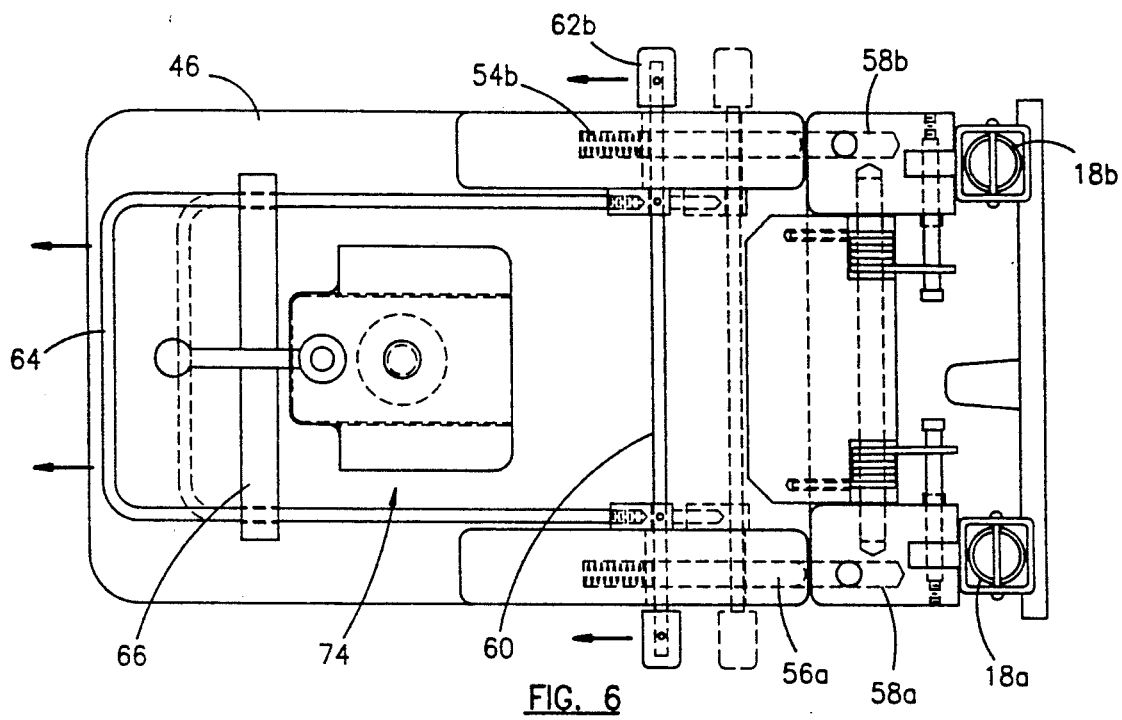
FIG. 6 is a bottom plan view of the invention showing how the support shafts are inserted and withdrawn.

Attached to the support shaft pull rod 60 is a center pull rod 64, which is preferably a U-shaped rod attached at the U-ends to the support shaft pull rod 60 as shown in FIG. 6. Towards the base of the U-shaped center pull rod 64, the rod 64 is slidably secured by a securement bracket 66 mounted on the underside of the folding table.

Figure 7:
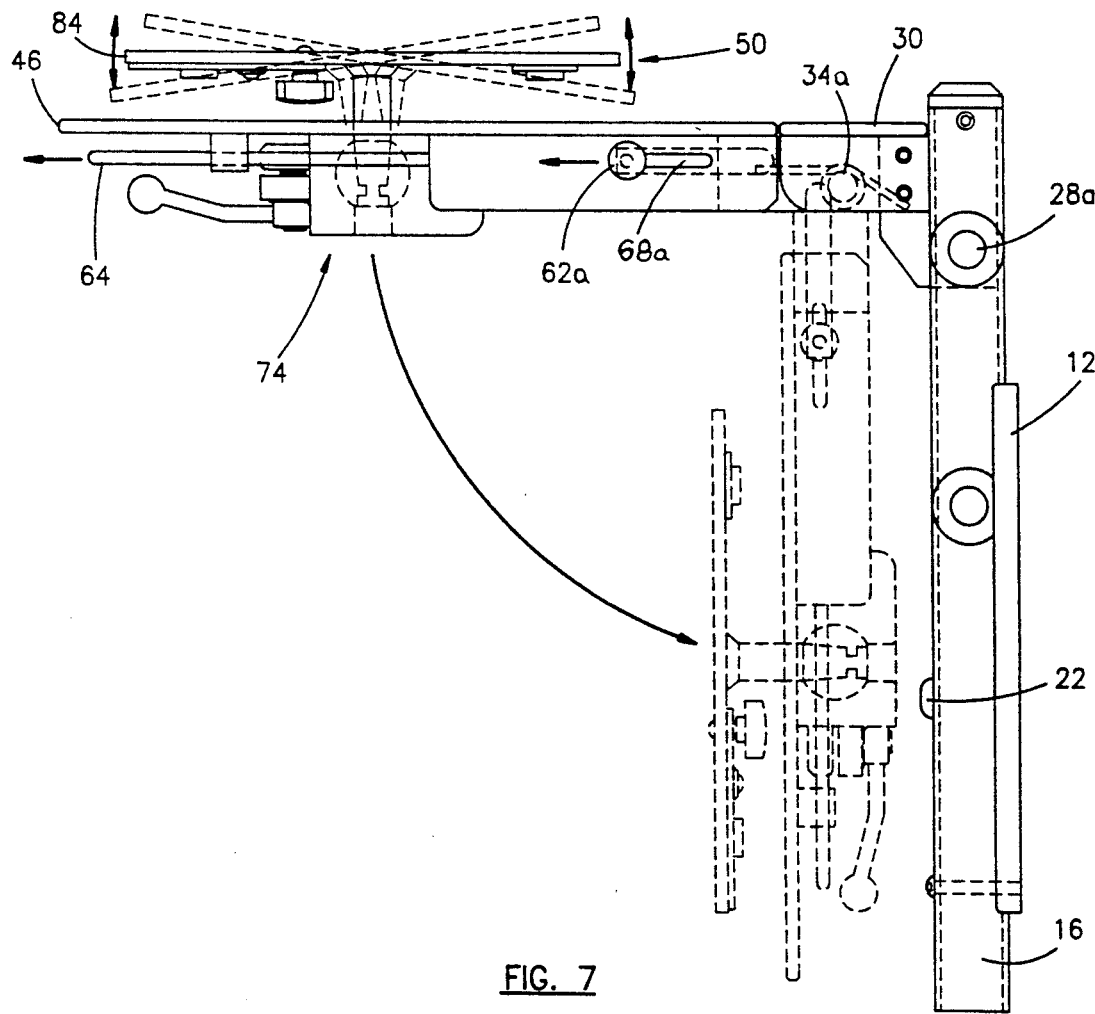
FIG. 7 is a side elevational view of the invention showing the table being folded to its storage position.

The folding table 46 may be secured in a horizontal support position, as shown in FIGS. 6 and 7, by extending the support shafts 56a and 56b into the support shaft receiving holes 58a and 58b in the stationary table blocks 28a and 28b. The support shafts 56a and 56b are extended due to force exerted by the expanding compression springs 54a and 54b. The center pull rod 64 or the support shaft pull rod 60 may be used to withdraw the support shafts 56a and 56b from extended position by moving either device forward. To allow the support shaft pull rod 60 to slide freely within each folding table block 48a and 48b, a horizontal channel 68a and 68b may be formed in each folding table block 48a and 48b extending from the rear edge of each block approximately ⅓ of the longitudinal length of each block 48a and 48b, thereby creating a channel 68a and 68b (FIGS. 5 and 7) similar to that found in a tuning fork.

Formed in the forward center portion of the folding table 46 is a hole 70, preferably oval in shape, and preferably 4 smaller bolt holes 72a through 72d, as shown in FIG. 4. Mounted to the underside of the folding table 46, using bolts inserted through the bolt holes 72a and 72d as securement means, is a ball vise apparatus 74.

Figure 8:
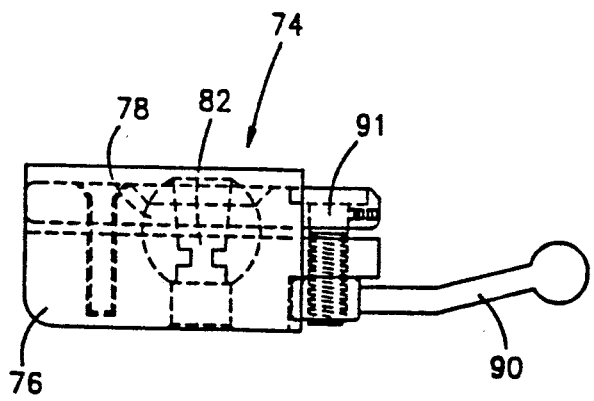
FIG. 8 is a side elevational view of the ball vise joint.
Figure 9:
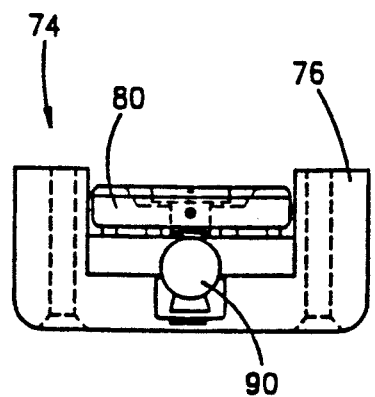
FIG. 9 is a front elevational view of the ball vise joint.
Figure 10:
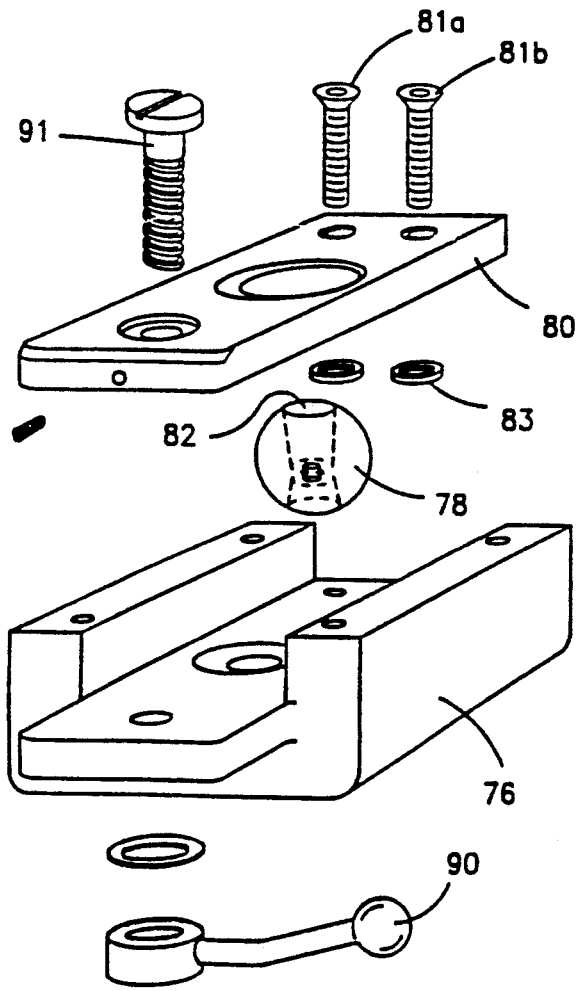
FIG. 10 is an exploded perspective view of the ball vise joint.

The ball vise apparatus 74 is seen in FIGS. 8-10 as constructed of three basic pieces, the vise base 76, the ball 78 and the top plate 80. Also included are a pair of top plate securement bolts 81a and 81b and assorted washers 83. The ball vise apparatus 74 is preferably a standard ball vise modified in two ways, one, the vise base 76 is modified to mount on the underside of the folding table 46 as shown in FIGS. 2 and 10 by the U-shape of the vise base 76 and two, the ball 80 has a table shaft receiving hole 82 shaped preferably like a goblet, best seen in FIG. 8.

A preferred embodiment of the computer support table 50, shown in FIGS. 2 and 7, includes a table top 84 and a table shaft 86 which depends downwards from approximately the center of the table top 84. The table shaft 86 may be inserted through the hole 70 in the folding table 46 into the table shaft receiving hole 82 in the ball 78 of the ball vise apparatus 74 and secured there by a screw 88. The computer support table 50 may thus be tilted from horizontal and secured at the desired angle by tightening the ball vise apparatus 74 by rotating the tightening clamp arm 90 thus tightening the tightening screw 91. The ball vise apparatus 74 enables the table top 84 to be tilted front to back as indicated by arrow 96 in FIG. 1 as well as side to side as indicated by arrow 98 or any angle therebetween to accommodate any particular conductor. A computer may be secured on the computer support table 50 by a fastening screw 92 on the table top 84.

As disclosed in the preferred embodiment, the universal computer support bracket 10 fulfills many of the unique needs of railroad operators.

Its rugged construction and ease of adjustment permit the bracket 10 to be used where other commercially available support stands would fail. Moreover, the ability of the folding table 46 to fold down against the channel alignment plate 12 to a storage position allows the user to save otherwise unusable space. This feature is especially important in use in railroad cabs, which are often cramped and require efficient use of space.

It is to be understood that the above description is not intended in any way to limit the scope of the present invention, which shall follow from the claims set forth below.

There has thus been set forth and described an invention which accomplishes at least all of the stated objectives.

I claim:

1. A universal computer support bracket comprising,
   a channel having a longitudinal axis, said channel having means for mounting to a vertical surface,
   a folding table support bracket having first and second ends and means at said first end for slidably engaging said channel such that said folding table support bracket may be slid in a direction generally parallel to said longitudinal axis of said channel,
   a folding table having top and bottom surfaces, said table pivotally mounted adjacent said second end of said support bracket such that said folding table may be pivoted between a substantially horizontal support position and a substantially vertical storage position,
   a pivot joint assembly mounted on said folding table, and
   a computer support table mounted on said pivot joint assembly such that said computer support table may be tilted relative to said folding table.

2. A universal computer support bracket of claim 1 wherein said channel further comprises a pair of channels and a channel alignment plate, said channels mounted on said channel alignment plate in generally parallel alignment, said channel alignment plate adapted to be mounted on a vertical surface.

3. A universal computer support bracket of claim 2 wherein said pair of channels further comprise a pair of compression springs, one mounted within each channel and attached at one end to a lower end of a channel and at the other end to said folding table support bracket whereby raising and lowering of said bracket may be greatly facilitated.

4. A universal computer support bracket of claim 2 wherein said folding table support bracket further comprises a pair of channel guide sections adapted to fit and be slidably secured within each of said channels and a substantially horizontal table section extending between and connected to said guide sections.

5. A universal computer support bracket of claim 1 wherein said folding table further comprises a securement and release means operatively mounted on said folding table such that said folding table may be releasably secured in either said support position or said storage position.

6. A universal computer support bracket of claim 1 wherein said folding table further comprises a hole extending through said table connecting said top and bottom surfaces.

7. A universal computer support bracket of claim 6 wherein said computer support table further comprises a shaft extending downwards from a bottom surface of said support table, said shaft mounted thereon.

8. A universal computer support bracket of claim 7 wherein said pivot joint assembly is mounted on said bottom surface of said folding table such that said shaft of said computer support table may extend downwards through said hole in said folding table and be secured in said pivot joint assembly whereby said computer support table may be tilted relative to said folding table.

9. A universal computer support bracket of claim 1 wherein said pivot joint assembly comprises a ball vise assembly, said ball vise assembly comprising a securable ball and socket type joint.

10. In a railroad locomotive cab having an upright support wall, a
    universal computer support bracket comprising,
    a channel having a longitudinal axis, said channel mounted on said upright support wall,
    a folding table support bracket having first and second ends and means at said first end for slidably engaging said channel such that said folding table support bracket may be slid in a direction generally parallel to said longitudinal axis of said channel, a folding table having top and bottom surfaces, said table pivotally mounted adjacent said second end of said support bracket such that said folding table may be pivoted between a substantially horizontal support position and a substantially vertical storage position, a pivot joint assembly mounted on said folding table, and a computer support table mounted on said pivot joint assembly such that said computer support table may be tilted relative to said folding table.

11. A universal computer support bracket of claim 10 wherein said channel further comprises a pair of channels and a channel alignment plate, said channels mounted on said channel alignment plate in generally parallel alignment, said channel alignment plate adapted to be mounted on said upright support wall.

12. A universal computer support bracket of claim 11 wherein said pair of channels further comprise a pair of compression springs, one mounted within each channel and attached at one end to a lower end of a channel and at the other end to said folding table support bracket whereby raising and lowering of said bracket may be greatly facilitated.

13. A universal computer support bracket of claim 11 wherein said folding table support bracket further comprises a pair of channel guide sections adapted to fit and be slidably secured within each of said channels and a substantially horizontal table section extending between and connected to said guide sections.

14. A universal computer support bracket of claim 10 wherein said folding table further comprises a securement and release means operatively mounted on said folding table such that said folding table may be releasably secured in either said support position or said storage position.

15. A universal computer support bracket of claim 10 wherein said folding table further comprises a hole extending through said table connecting said top and bottom surfaces.

16. A universal computer support bracket of claim 15 wherein said computer support table further comprises a shaft extending downwards from a bottom surface of said support table, said shaft mounted thereon.

17. A universal computer support bracket of claim 16 wherein said pivot joint assembly is mounted on said bottom surface of said folding table such that said shaft of said computer support table may extend downwards through said hole in said folding table and be secured in said pivot joint assembly whereby said computer support table may be tilted relative to said folding table.

18. A universal computer support bracket of claim 10 wherein said pivot joint assembly comprises a ball vise assembly, said ball vise assembly comprising a securable ball and socket type joint.

* * * * *